(12) United States Patent
Lee et al.

(10) Patent No.: US 8,908,320 B2
(45) Date of Patent: Dec. 9, 2014

(54) SPINDLE MOTOR HAVING LOWER THRUST MEMBER WITH FITTING PROTRUSION AND HARD DISK DRIVE INCLUDING THE SAME

(71) Applicant: Samsung Electro-Mechanics Co., Ltd., Suwon (KR)

(72) Inventors: Ta Kyoung Lee, Suwon (KR); Satoru Sodeoka, Suwon (KR)

(73) Assignee: Samsung Electro-Mechanics Co., Ltd., Suwon-Si (KR)

( * ) Notice: Subject to any disclaimer, the term of this patent is extended or adjusted under 35 U.S.C. 154(b) by 0 days.

(21) Appl. No.: 13/785,683

(22) Filed: Mar. 5, 2013

(65) Prior Publication Data

US 2014/0036390 A1    Feb. 6, 2014

(30) Foreign Application Priority Data

Aug. 6, 2012  (KR) ........................ 10-2012-0085883

(51) Int. Cl.
G11B 19/20    (2006.01)
G11B 25/04    (2006.01)
H02K 7/08     (2006.01)
H02K 5/16     (2006.01)
H02K 5/167    (2006.01)

(52) U.S. Cl.
CPC .............. H02K 7/086 (2013.01); H02K 5/1677 (2013.01); H02K 2205/03 (2013.01)
USPC ........................ 360/99.08; 310/90; 310/67 R (58) Field of Classification Search
CPC . H02K 7/086; H02K 2205/03; H02K 5/1677; G11B 19/2036; G11B 19/2009
USPC .......... 360/99.08, 98.07, 99.04; 310/90, 67 R
See application file for complete search history.

(56) References Cited

U.S. PATENT DOCUMENTS

| | | |
|---|---|---|
| 2006/0147135 A1 | 7/2006 | Kim |
| 2012/0043842 A1 | 2/2012 | Choi |
| 2013/0279043 A1 | 10/2013 | Kodama et al. |
| 2014/0078615 A1* | 3/2014 | Park ............................... 310/90 |

FOREIGN PATENT DOCUMENTS

| | | |
|---|---|---|
| JP | 8-163821 | 6/1996 |
| JP | 11-264409 | 9/1999 |
| JP | 2002-349549 | 12/2002 |
| JP | 3549389 B2 | 4/2004 |

(Continued)

OTHER PUBLICATIONS

Korean Office Action issued Sep. 17, 2013 in corresponding Korean Patent Application No. 10-2012-0085883.

(Continued)

*Primary Examiner* — Craig A. Renner (57) ABSTRACT

There are provided a spindle motor and a hard disk drive including the same, the spindle motor including: a lower thrust member fixedly attached to a base member; a shaft fixedly attached to the lower thrust member and including an expansion groove formed in an outer peripheral surface thereof in a circumferential direction; a sleeve disposed above the lower thrust member and rotatably attached to the shaft; and a rotor hub coupled to the sleeve and rotating together therewith, wherein the lower thrust member includes a fitting protrusion protruded upwardly from an inner portion thereof in an axial direction and press-fitted into a fixing groove provided in a lower end portion of the shaft upwardly in the axial direction.

20 Claims, 8 Drawing Sheets

(56) References Cited

FOREIGN PATENT DOCUMENTS

| | | |
|---|---|---|
| JP | 2008-190660 | 8/2008 |
| JP | 2013-224705 | 10/2013 |
| KR | 10-2006-0079630 | 7/2006 |
| KR | 10-2012-0016935 | 2/2012 |
| KR | 10-2012-0049029 | 5/2012 |

OTHER PUBLICATIONS

Japanese Office Action mailed Feb. 18, 2014 in corresponding Japanese Application No. 2013-030220.

* cited by examiner

FIG. 8

SPINDLE MOTOR HAVING LOWER THRUST MEMBER WITH FITTING PROTRUSION AND HARD DISK DRIVE INCLUDING THE SAME

CROSS-REFERENCE TO RELATED APPLICATIONS

This application claims the priority of Korean Patent Application No. 10-2012-0085883 filed on Aug. 6, 2012, in the Korean Intellectual Property Office, the disclosure of which is incorporated herein by reference.

BACKGROUND OF THE INVENTION

1. Field of the Invention

The present invention relates to a spindle motor and a hard disk drive including the same.

2. Description of the Related Art

A fixed shaft-type spindle motor in which a shaft having excellent vibration characteristics is fixed to a case of a hard disk driving device is generally mounted in an information recording and reproducing device such as a hard disk driving device for a server.

That is, the shaft may be fixedly installed in the spindle motor mounted in a hard disk driving device for a server in order to prevent information recorded on the disk from being damaged and becoming unrecordable or unreadable due to an increase in an amplitude of vibration of a rotor caused by external impacts.

As described above, in the case in which the fixed shaft-type is installed, upper and lower thrust members are fixedly attached to the shaft.

However, in the case in which the shaft is fixedly attached to the lower thrust member and the lower thrust member is fixed to a base, since the shaft serving as a rotating shaft should be firmly fixed, the lower thrust member may be relatively thick and fixed to an outer peripheral surface of the shaft in a scheme such as a press-fitting scheme, a bonding scheme, a sliding scheme, or the like.

Meanwhile, in accordance with the recent trend for thinness in hard disk drives, the spindle motor used therein has been thinned. However, in the case in which the lower thrust member is relatively thick, as described above, the thinness of the spindle motor has been hindered and a bearing span is inevitably shortened, such that motor performance may be deteriorated.

Figure 4:
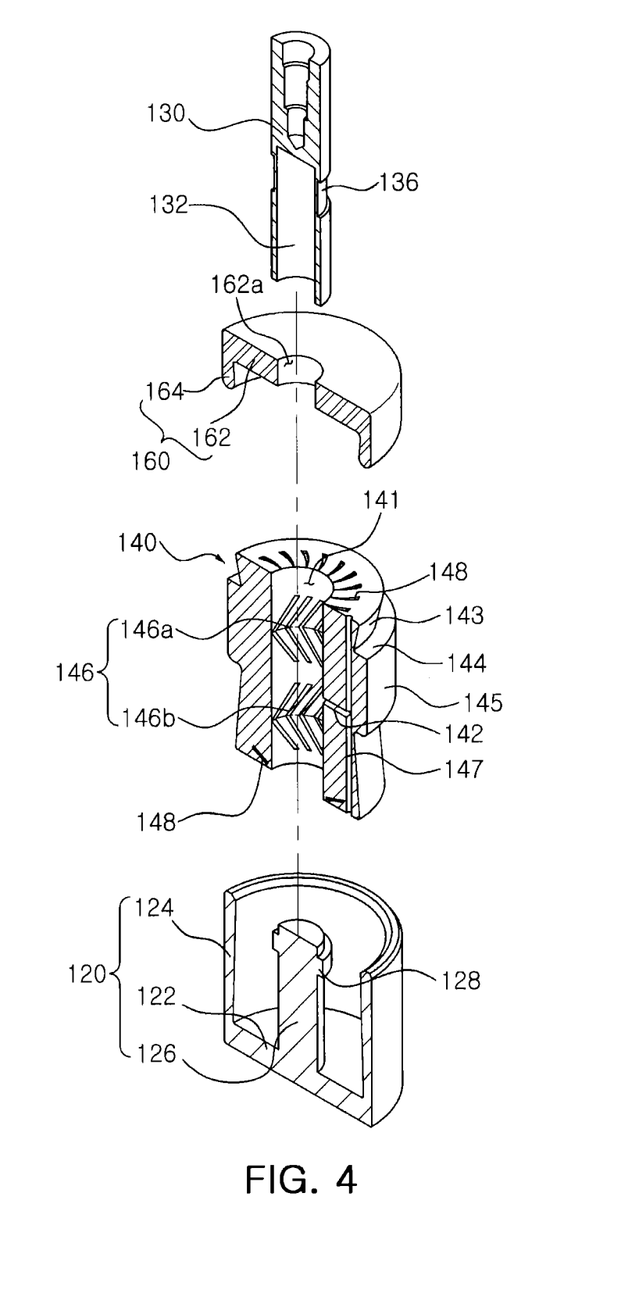
FIG. 4 is a partially cut-away exploded perspective view showing a sleeve and upper and lower thrust members according to the embodiment of the present invention.

Related Art Document described below relates to a fixed shaft-type spindle motor and includes upper and lower thrust members (230 and 220). In FIG. 4 thereof, in the case of a structure in which a shaft (210) is fixed to the thrust member (220), the shaft (210) may only be firmly fixed to the lower thrust member (220) if the lower thrust member 220 is relatively thick.

RELATED ART DOCUMENT

Korean Patent Laid-open Publication No. 2006-0079630

SUMMARY OF THE INVENTION

An aspect of the present invention provides a relatively thin spindle motor through forming a lower thrust member to be thin while using a fixed shaft-type spindle motor.

Another aspect of the present invention provides a spindle motor having improved operation performance through a lower thrust member formed to be thin and forming a bearing span to be relatively elongated, while using a fixed shaft-type spindle motor.

According to an aspect of the present invention, there is provided a spindle motor including: a lower thrust member fixedly attached to a base member; a shaft fixedly attached to the lower thrust member and including an expansion groove formed in an outer peripheral surface thereof in a circumferential direction; a sleeve disposed above the lower thrust member and rotatably attached to the shaft; and a rotor hub coupled to the sleeve and rotating together therewith, wherein the lower thrust member includes a fitting protrusion protruded upwardly from an inner portion thereof in an axial direction and press-fitted into a fixing groove provided in a lower end portion of the shaft upwardly in the axial direction.

An outer peripheral surface of the fitting protrusion may be provided with a pressing protrusion.

The fitting protrusion may be fitted so that the pressing protrusion is disposed to correspond to a position of an inner peripheral surface of the shaft in which the expansion groove is provided in an outer peripheral surface thereof.

The expansion groove may be expanded in an outer diameter direction by the fitting of the pressing protrusion.

The expansion groove may be expanded so that at least a portion thereof is level with the outer peripheral surface of the shaft.

The expansion groove may be expanded so that the at least a portion thereof is positioned inwardly of the outer peripheral surface of the shaft.

The outer peripheral surface of the shaft or an inner peripheral surface of the sleeve may have upper and lower radial dynamic pressure grooves, and the expansion groove may be positioned between the upper and lower radial dynamic pressure grooves.

The pressing protrusion may be provided around the outer peripheral surface of the fitting protrusion in the circumferential direction in a circular manner.

The pressing protrusion may be provided around the outer peripheral surface of the fitting protrusion in the circumferential direction in a spiral manner.

The fitting protrusion and the fixing groove may have an adhesive applied therebetween The shaft may include a through-hole allowing the fixing groove and the exterior to be in communication in the axial direction.

The fitting protrusion of the lower thrust member may include a communications hole vertically penetrating therethrough in the axial direction.

The lower thrust member may form a liquid-vapor interface between the lower thrust member and the sleeve.

The spindle motor may further include an upper thrust member fixedly attached to an upper portion of the shaft and forming a liquid-vapor interface between the upper thrust member and the sleeve.

The sleeve and rotor hub may be formed integrally with each other.

The base member and the lower thrust member may be formed integrally with each other.

According to another aspect of the present invention, there is provided a hard disk drive including: the spindle motor described above for rotating a disk by power applied through a substrate; a magnetic read/write head writing date to the disk and reproducing data from the disk; and a magnetic read/write head transfer part transferring the magnetic read/write head to a predetermined position above the disk.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like elements.

Figure 1:
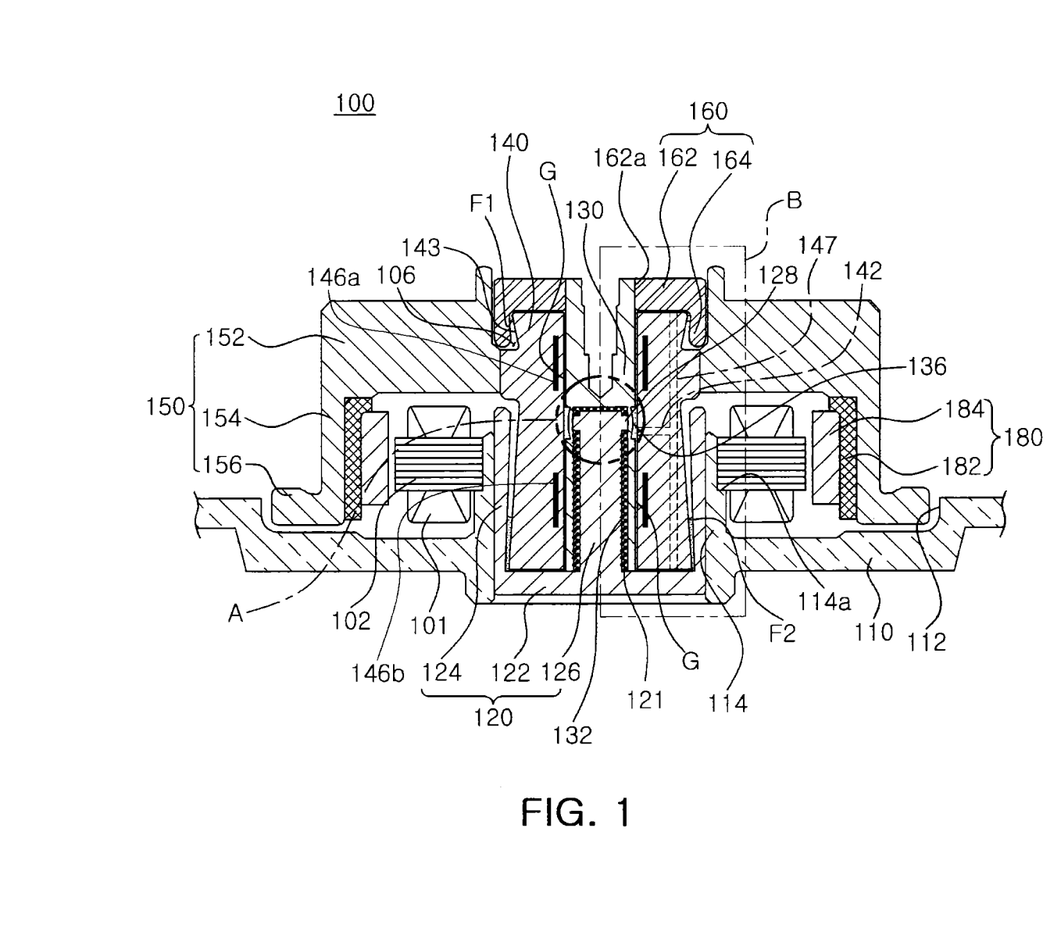
FIG. 1 is a schematic cross-sectional view showing a spindle motor according to an embodiment of the present invention.
Figure 2:
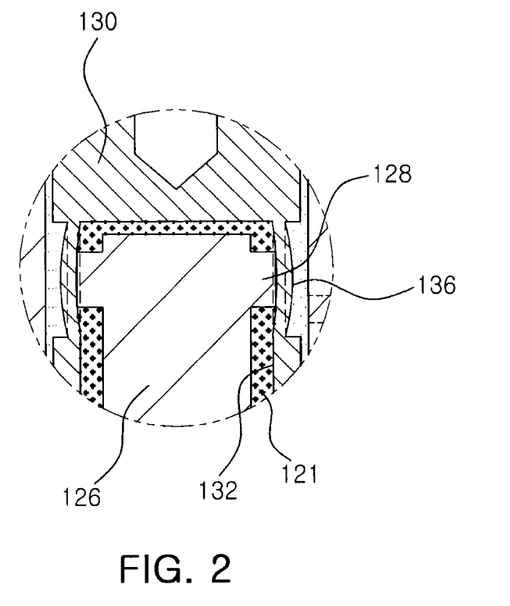
FIG. 2 is an enlarged view of part A of FIG. 1.
Figure 3:
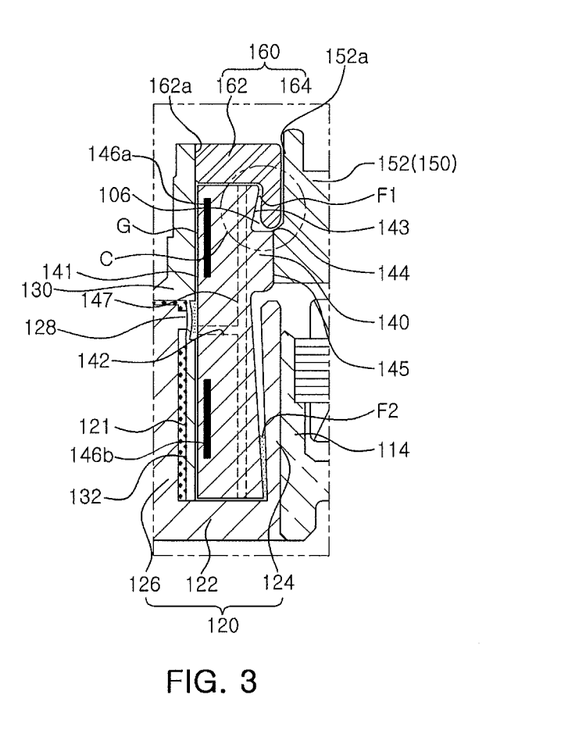
FIG. 3 is an enlarged view showing part B of FIG. 1.
Figure 5:
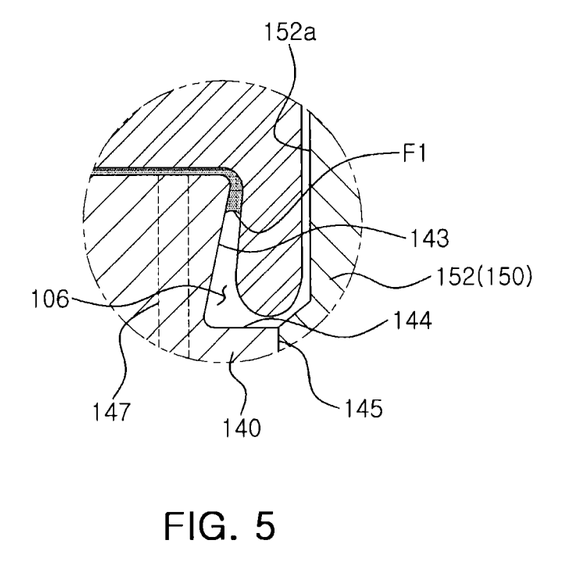
FIG. 5 is an enlarged view showing part C of FIG. 3.
Figure 6A:
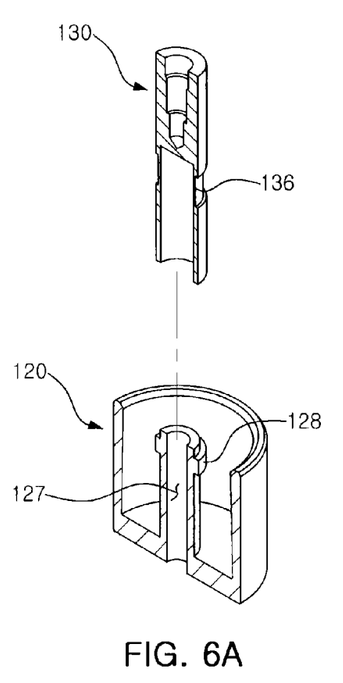
FIGS. 6A and 6B are cut-away perspective views showing the lower thrust member and a shaft according to the embodiment of the present invention.
Figure 6B:
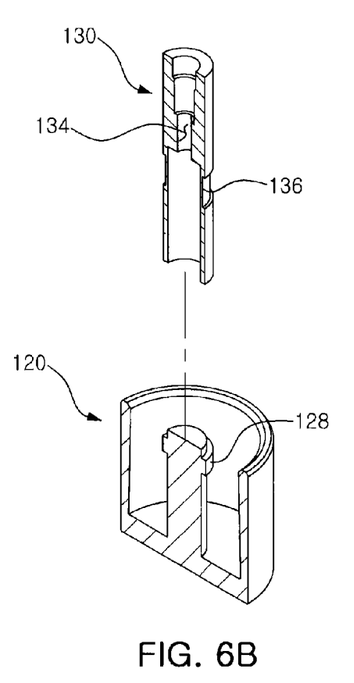
Figure 7A:
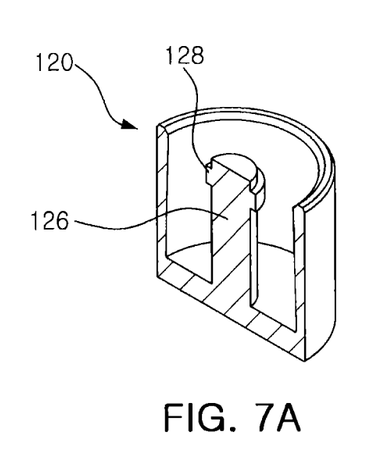
FIGS. 7A and 7B are cut-away perspective views showing the lower thrust member according to the embodiment of the present invention.
Figure 7B:
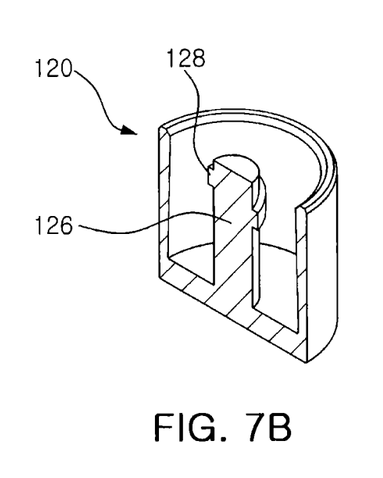

FIG. 1 is a schematic cross-sectional view showing a spindle motor according to an embodiment of the present invention; FIG. 2 is an enlarged view of part A of FIG. 1; FIG. 3 is an enlarged view showing part B of FIG. 1; FIG. 4 is a partially cut-away exploded perspective view showing a sleeve and upper and lower thrust members according to the embodiment of the present invention; FIG. 5 is an enlarged view showing part B of FIG. 1; FIGS. 6A and 6B are cut-away perspective views showing the lower thrust member and a shaft according to the embodiment of the present invention; and FIGS. 7A and 7B are cut-away perspective views showing the lower thrust member according to the embodiment of the present invention.

Referring to FIGS. 1 through 7, a spindle motor 100 according to the embodiment of the present invention may include a base member 110, a lower thrust member 120, a shaft 130, a sleeve 140, a rotor hub 150, and an upper thrust member 160.

Here, terms with respect to directions will be defined. As viewed in FIG. 1, an axial direction refers to a vertical direction, that is, a direction from a lower portion of the shaft 130 toward an upper portion thereof or a direction from the upper portion of the shaft 130 toward the lower portion thereof, a radial direction refers to a horizontal direction, that is, a direction from the shaft 130 toward an outer peripheral surface of the rotor hub 150 or from the outer peripheral surface of the rotor hub 150 toward shaft 130, and a circumferential direction refers to a rotation direction along the outer surfaces of the rotor hub 150 and the shaft 130.

The base member 110 may include a mounting groove 112 formed therein so as to form a predetermined space together with the rotor hub 150. In addition, the base member 110 may include a coupling part 114 extended in an upward axial direction and having a stator core 102 installed on an outer peripheral surface thereof.

In addition, the coupling part 114 may include a seat surface 114a provided in the outer peripheral surface thereof so that the stator core 102 may be seated and installed thereon. Further, the stator core 102 seated on the coupling part 114 may be disposed above the mounting groove 112 of the base member 110 described above.

Here, the base member 110 may be manufactured using aluminum (Al) in a die-casting scheme or be manufactured by performing plastic working (for example, press working) on a steel sheet.

The lower thrust member 120 may be fixedly mounted on the base member 110. That is, the lower thrust member 120 may be insertedly installed in the coupling part 114. More specifically, the lower thrust member 120 may be installed so that an outer peripheral surface thereof is bonded to an inner peripheral surface of the coupling part 114.

Meanwhile, the lower thrust member 120 may include a disk part 122 having an outer surface fixedly attached to the base member 110, an extension part 124 extended upwardly from an outer edge of the disk part 122 in the axial direction, and a fitting protrusion 126 protruding upwardly from the center of the disk part 122 in the axial direction to be press-fitted into a fixing groove 132 formed in a lower end portion of a shaft 130 to be described below.

That is, the lower thrust member 120 may have a cup shape with a hollow part and a protrusion provided at the center of the hollow part. That is, the lower thrust member 120 may have an 'E' shaped cross section.

Here, the fitting protrusion 126 of the lower thrust member 120 may include a communications hole 127 vertically penetrating therethrough in the axial direction (please see FIG. 6A). In a process of press-fitting the fitting protrusion 126 into a fixing groove 132, the communications hole 127 may allow air present in the fixing groove 132 to be naturally discharged therefrom, thereby improving coupling strength.

A lower end surface of the shaft 130 may be provided with the fixing groove 132 provided in a lower end portion of the shaft upwardly in the axial direction, wherein the fixing groove 132 may include the fitting protrusion 126 of the lower thrust member 120 press-fitted thereinto. In addition, the fitting protrusion 126 may be press-fitted into the fixing groove 132 in a state in which an inner surface of the fixing groove 132 or an outer surface of the fitting protrusion 126 is applied with an adhesive 121, such that bonding by the adhesive 121 may be additionally performed.

In the case in which the fitting protrusion 126 having nothing formed on an outer peripheral surface thereof is press-fitted into the fixing groove 132, slide-bonding may be preformed, but it may be practically difficult to perform the press-fitting in this case. In order to perform the press-fitting in a state in which the surfaces of rigid bodies are closely adhered to each other, a significant amount of strength is required, or deformation of members to be bonded may be generated in a bonding process.

Therefore, in the present invention, the outer peripheral surface of the fitting protrusion 126 may be provided with a pressing protrusion 128 (please see FIGS. 7A and 7B). The pressing protrusion 128 may protrude outwardly from the outer peripheral surface of the fitting protrusion 126 in the radial direction. In the case in which the outer peripheral surface of the fitting protrusion 126 is provided with the pressing protrusion 128, since only the pressing protrusion 128 contacts an inner peripheral surface of the fixing groove 132, a contact area is relatively reduced, such that the fitting protrusion 126 may be press-fitted into the fixing groove 132.

However, even in the case that the fitting protrusion 126 is press-fitted into the fixing groove 132 in a state in which the outer peripheral surface thereof is provided with the pressing protrusion 128, an outer diameter of the shaft 130 may be expanded by the pressing protrusion 128.

Therefore, in the embodiment of the present invention, an outer peripheral surface of the shaft 130 may be provided with an expansion groove 136 depressed in inner diameter direction, and the fitting protrusion 126 may be press-fitted so that the pressing protrusion 128 may be disposed to correspond to a position of an inner peripheral surface of the shaft 130 in which the expansion groove 136 is provided in an outer peripheral surface thereof.

When the shaft 130 has this shape, in the case in which the fitting protrusion 126 having the pressing protrusion 128 is press-fitted into the fixing groove 132, since the outer peripheral surface of the portion of the shaft into which the pressing protrusion 128 is fitted is formed with the expansion groove 136 in advance in consideration of expansion of the outer diameter thereof, even in the case that the outer diameter of the portion of the shaft into which the pressing protrusion 128 is fitted is slightly expanded, the portion into which the pressing protrusion 128 is fitted may be expanded to be level with the surface of the outer peripheral surface of the shaft other than the portion thereof in which the expansion groove 136 is formed or may be expanded so that the outer peripheral of the expansion groove 136 is positioned inwardly thereof in the radial direction. As a result, the expansion of the shaft 130 may be prevented.

That is, comparing the expansion groove 136 provided in the outer peripheral surface of the shaft 130 before the fitting protrusion 126 is press-fitted into the fixing groove 132 (please see FIG. 4) and the expansion groove 136 provided in the outer peripheral surface of the shaft 130 after the fitting protrusion 126 is press-fitted into the fixing groove 132 (please see FIG. 2) with each other, it may be appreciated that the expansion groove 136 is expanded in the outer diameter direction in the case of the latter. However, even in the case of this expansion, a bottom surface of the expansion groove 136 may be positioned to be even with the outer peripheral surface of portions of the shaft other than the portion thereof in which the expansion groove 136 is formed, or positioned inwardly of the outer peripheral surface of the shaft in the radial direction.

In addition, the lower thrust member 120 may be included, together with the base member 110, in a fixed member, that is, a stator.

Meanwhile, upper and lower radial dynamic pressure grooves 146a and 146b may be formed in the outer peripheral surface of the shaft 130 or an inner peripheral surface of the sleeve 140, and the expansion groove 136 may be provided so as to be positioned between the upper and lower radial dynamic pressure grooves 146a and 146b.

Even in the case in which the fitting protrusion 126 including the pressing protrusion 128 is press-fitted into the fixing groove 132, it may not be easy to allow the bottom surface of the expansion groove 136 to be expanded so as to form the same surface as the surface portions other than the portion in which the expansion groove 136 is formed. Therefore, the expansion groove 136 may be positioned between the upper and lower radial dynamic pressure grooves 146a and 146b so as to be less affected, even in the case that the expansion groove 136 is expanded in an unexpected manner.

The pressing protrusion 128 may be formed along the outer peripheral surface of the fitting protrusion 126 in the circumferential direction to have a circular ring shape (please see FIG. 7A) or a spiral shape (please see FIG. 7B).

In addition, a thrust dynamic pressure groove 148 for generating thrust fluid dynamic pressure may be formed in at least one of an upper surface of the lower thrust member 120 and a bottom surface of the sleeve 140.

The shaft 130 may be fixedly attached to the lower thrust member 120. That is, the fitting protrusion 126 provided in the lower thrust member 120 may be fitted into the fixing groove 132 provided in a lower end portion of the shaft 130 upwardly in the axial direction, such that the shaft 130 may be firmly fixed to the lower thrust member 120.

That is, the lower end surface of the shaft 130 may be provided with the fixing groove 132 depressed upwardly in the axial direction, wherein the fixing groove 132 may include the fitting protrusion 126 of the lower thrust member 120 press-fitted thereinto.

However, while the case in which the shaft 130 is fixedly attached to the lower thrust member 120 is described by way of example in the present invention, the present invention is not limited thereto. That is, in the case in which the lower thrust member 120 is formed integrally with the base member 110, the shaft 130 may be fixedly attached to the base member 110.

Meanwhile, the shaft 130 may also be included in the fixed member, that is, the stator, together with the lower thrust member 120 and the base member 110.

Meanwhile, an upper surface of the shaft 130 may be provided with a coupling unit, for example, a screw part having a screw screwed thereinto so that a cover member (not shown) may be fixedly installed.

In addition, the shaft 130 may include a through-hole 134 vertically penetrating therethrough in the axial direction to allow the fixing groove and the exterior to be in communication (please see FIG. 6B). In a process of press-fitting the fitting protrusion 134 into the fixing groove 132, the through-hole 134 may allow air provided in the fixing groove 132 to be naturally discharged therethrough, thereby improving coupling strength.

The sleeve 140 may be rotatably attached to the shaft 130. To this end, the sleeve 140 may include a through-hole 141 into which the shaft 130 is inserted. Meanwhile, in the case in which the sleeve 140 is attached to the shaft 130, the inner peripheral surface of the sleeve 140 and the outer peripheral surface of the shaft 130 may be spaced apart from each other to form a bearing clearance G therebetween. In addition, a lubricating fluid may be provided in the bearing clearance G.

Meanwhile, the sleeve 140 may have an inclination part 143 formed at an upper portion thereof so as to form a liquid-vapor interface together with the upper thrust member 160, wherein the inclination part 143 has an outer diameter larger in an upper portion thereof than in a lower portion thereof.

In other words, the inclination part 143 having the outer diameter larger in the upper portion thereof than in the lower portion thereof may be formed on the upper portion of the sleeve 140 so that a first liquid-vapor interface F1 may be formed in a space between an outer peripheral surface of the sleeve 140 and an inner peripheral surface of the upper thrust member 160.

Meanwhile, the sleeve 140 may include a step surface 144 stepped in the upper end portion thereof in order to form a sealing groove 106. A detailed description of the step surface 144 will be provided below.

In addition, the sleeve 140 may include the rotor hub 150 bonded to the outer peripheral surface thereof. That is, a lower portion of the step surface 144 may have a shape corresponding to that of an inner surface of the rotor hub 150, such that the rotor hub 150 may be fixedly installed thereon. That is, the sleeve 140 may include a bonding surface 145 formed on the outer peripheral surface thereof. Here, the sleeve 140 and the rotor hub 150 may be formed integrally with each other. In the case in which the sleeve 140 and the rotor hub 150 are formed integrally with each other, since both the sleeve 140 and the rotor hub 150 are provided as a single member, the number of components may be reduced, such that it may be easy to assemble the product.

Meanwhile, a lower portion of the outer peripheral surface of the sleeve 140 may be inclined upwardly in an inner diameter direction so as to form a liquid-vapor interface together with the extension part 124 of the lower thrust member 120.

That is, the lower portion of the sleeve 140 may be inclined upwardly in the inner diameter direction so that a second liquid-vapor interface F2 may be formed in a space between the outer peripheral surface of the sleeve 140 and the extension part 124 of the lower thrust member 120.

As described above, since the second liquid-vapor interface F2 is formed in the space between the lower portion of the sleeve 140 and the extension part 124, the lubricating fluid provided in the bearing clearance G may form the first and second liquid-vapor interfaces F1 and F2.

In addition, the sleeve 140 may include radial dynamic pressure grooves 146 formed in the inner surface thereof in order to generate fluid dynamic pressure in the lubricating fluid provided in the bearing clearance G at the time of rotation of the sleeve 140. That is, the radial dynamic pressure groove 146 may include the upper and lower dynamic pressure grooves 146a and 146b, as shown in FIG. 4.

However, the radial dynamic pressure groove is not limited to being formed in the inner surface of the sleeve 140, but may be formed in the outer peripheral surface of the shaft 130 with various patterns such as a herringbone pattern, a spiral pattern, a helix pattern, or the like.

Further, the sleeve 140 may further include a circulation hole 147 allowing the upper and lower surfaces thereof to be in communication. The circulation hole 147 may discharge air bubbles contained in the lubricating fluid of the bearing clearance G to the exterior and facilitate circulation of the lubricating fluid.

Further, the sleeve may further include a communications hole 142 allowing the bearing clearance G formed by the sleeve 140 and the shaft 130 and the circulation hole 147 to be in communication. The communications hole 142 may allow the circulation hole 147 to be in communication with the bearing clearance G, that is, between the upper and lower radial dynamic pressure grooves 146a and 146b therein. Therefore, generation of negative pressure between the upper and lower radial dynamic pressure grooves 146a and 146b may be prevented.

The rotor hub 150 is coupled to the sleeve 140 to thereby rotate together with the sleeve 140.

The rotor hub 150 may include a rotor hub body 152 including an insertion part 152a formed therein, the insertion part 152a including the upper thrust member 160 insertedly disposed in an inner portion thereof, a mounting part 154 extended from an edge of the rotor hub body 152 and including a magnet assembly 180 mounted on an inner surface thereof, and an extension part 156 extended from an edge of the mounting part 154 in an outer diameter direction.

Meanwhile, a lower portion of an inner surface of the rotor hub body 152 may be bonded to an outer surface of the sleeve 140. That is, the lower portion of the inner surface of the rotor hub body 152 may be press-fitted or be slid to be bonded to the bonding surface 145 of the sleeve 140 by an adhesive and/or welding.

Therefore, the sleeve 140 may rotate together with the rotor hub 150 at the time of rotation of the rotor hub 150.

In addition, the mounting part 154 may be extended downwardly from the rotor hub body 152 in the axial direction. Further, the mounting part 154 may include the magnet assembly 180 fixedly attached to the inner surface thereof.

Meanwhile, the magnet assembly 180 may include a yoke 182 fixedly attached to the inner surface of the mounting part 154 and a magnet 184 installed on an inner peripheral surface of the yoke 182.

The yoke 182 may serve to direct a magnetic field from the magnet 184 toward the stator core 102 to increase magnetic flux density. Meanwhile, the yoke 182 may have a circular ring shape or have a shape in which one end portion thereof is bent so as to increase magnetic flux density with the magnetic field generated by the magnet 184.

The magnet 184 may have an annular ring shape and be a permanent magnet generating a magnetic field having a predetermined strength by alternately magnetizing an N pole and an S pole in a circumferential direction.

Meanwhile, the magnet 184 may be disposed to face a front end of the stator core 102 having a coil 101 wound therearound and generate driving force through electromagnetic interaction with the stator core 102 having the coil 101 wound therearound so that the rotor hub 150 may rotate.

That is, when power is supplied to the coil 101, the driving force rotating the rotor hub 150 may be generated by the electromagnetic interaction between the stator core 102 having the coil 101 wound therearound and the magnet 184 disposed to face the stator core 102, such that the rotor hub 150 may rotate together with the sleeve 140.

The upper thrust member 160 may include a fixing hole 162a into which an upper end portion of the shaft 130 is fixedly press-fitted, such that the upper thrust member may be fixedly attached to the upper end portion of the shaft 130 and form the liquid-vapor interface together with the sleeve 140.

Meanwhile, the upper thrust member 160 may include a body 162 having the fixing hole 162a in which an inner surface thereof is bonded to the shaft 130, and a protrusion part 164 extended from the body 162 to form the liquid-vapor interface together with the inclination part 143.

The protrusion part 164 may be extended downwardly from the body 162 in the axial direction and have an inner surface disposed to face the inclination part 143.

In addition, the protrusion part 164 may be extended from the body 162 so as to be in parallel with the shaft 130.

Further, the upper thrust member 160 may be insertedly disposed in a space formed by an upper end portion of the outer peripheral surface of the shaft 130, the outer surface of the sleeve 140, and the inner surface of the rotor hub 150.

In addition, the upper thrust member 160, a fixed member fixedly attached together with the base member 110, the lower thrust member 120, and the shaft 130, may be a member configuring the stator.

Meanwhile, since the upper thrust member 160 is fixedly attached to the shaft 130 and the sleeve 140 rotates together with the rotor hub 150, the first liquid-vapor interface F1 formed in the space between the inclination part 143 of the sleeve 140 and the protrusion part 164 may be inclined toward the inclination part 143 of the sleeve 140 at the time of rotation of the sleeve 140, as shown in FIG. 5.

That is, the first liquid-vapor interface F1 may be inclined toward the outer peripheral surface of the sleeve 140, whereby scattering of the lubricating fluid may be further reduced by centrifugal force.

In addition, an outer peripheral surface of the upper thrust member 160 and the inner surface of the rotor hub 150 disposed to face the outer peripheral surface of the upper thrust member 160 may form a labyrinth seal. That is, an outer surface of the upper thrust member 160 and the inner surface of the rotor hub body 152 may be disposed to be spaced apart from each other by a predetermined interval and form the labyrinth seal so as to suppress the movement of air containing evaporated lubricating fluid to the exterior.

Therefore, the flow of air containing the evaporated lubricating fluid to the exterior may be suppressed, whereby a reduction in the amount of lubricating fluid may be suppressed.

In addition, the outer peripheral surface of the upper thrust member 160 and the inner surface of the rotor hub body 152 may form a clearance of 0.3 mm or less.

Meanwhile, a thrust dynamic pressure groove 148 for generating thrust dynamic pressure may be formed in at least one of a bottom surface of the upper thrust member 160 and the upper surface of the sleeve 140 disposed to face the bottom surface of the upper thrust member 160.

In addition, the upper thrust member 160 may also serve as a sealing member preventing the lubricating fluid provided in the bearing clearance G from being leaked upwardly.

In addition, the clearance between the upper thrust member 160 and the rotor hub 150 may have a relatively narrow interval to suppress the flow of the air containing the evaporated lubricating fluid to the exterior, whereby the reduction in the lubricating fluid provided in the bearing clearance G may be suppressed.

Meanwhile, in a rotating member, that is, the sleeve 140, and a fixed member, that is, the upper and lower thrust members, forming the liquid-vapor interfaces, for example, the first and second liquid-vapor interfaces F1 and F2; the rotating member, that is, the sleeve 140 may be disposed inside the fixed member in the radial direction, whereby scattering of the lubricating fluid may be reduced by centrifugal force.

Figure 8:
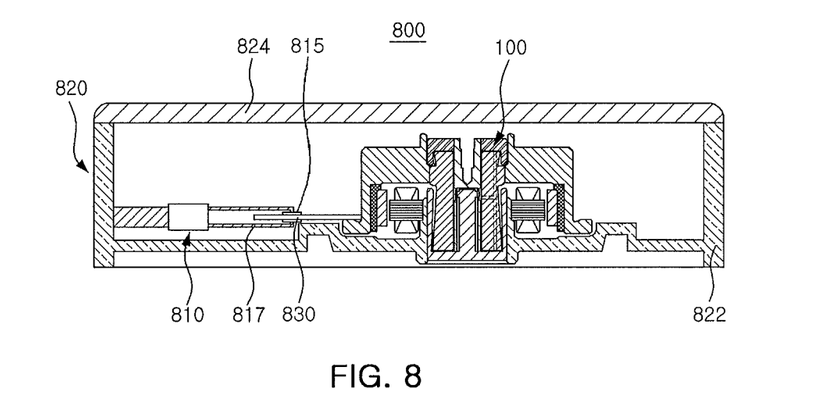
FIG. 8 is a schematic cross-sectional view showing a recording disk driving device having the motor mounted therein according to the embodiment of the present invention.

FIG. 8 is a schematic cross-sectional view of a recording disk driving device having a motor according to the embodiment of the present invention mounted therein.

Referring to FIG. 8, a recording disk driving device 800 including the motor 100 according to the embodiment of the present invention mounted therein may be a hard disk driving device and include the motor 100, a magnetic read/write head transfer part 810, and a housing 820.

The motor 100 has all the characteristics of the motor according to the embodiment of the present invention described above and may have a recording disk 830 mounted thereon.

The magnetic read/write head transfer part 810 may transfer a magnetic read/write head 815 reading information from the recording disk 830 mounted in the motor 100 to a position above a surface of the recording disk from which the information is to be detected.

Here, the magnetic read/write head 815 may be disposed on a support portion 817 of the magnetic read/write head transfer part 810.

The housing 820 may include a motor mounting plate 822 and a top cover 824 shielding an upper portion of the motor mounting plate 822 in order to form an internal space receiving the motor 100 and the magnetic read/write head transfer part 810.

As set forth above, according to embodiments of the present invention, the spindle motor capable of allowing the motor to be relatively thin by forming a relatively thin lower thrust member while using a fixed shaft-type spindle motor may be provided.

In addition, according to embodiments of the present invention, a spindle motor having improved operational performance through having a lower thrust member formed to be relatively thin and a bearing span formed to be relatively long while using the fixed shaft-type spindle motor may be provided.

While the present invention has been shown and described in connection with the embodiments, it will be apparent to those skilled in the art that modifications and variations can be made without departing from the spirit and scope of the invention as defined by the appended claims.

What is claimed is:

1. A spindle motor comprising:
    a lower thrust member fixedly attached to a base member;
    a shaft fixedly attached to the lower thrust member and including an expansion groove formed in an outer peripheral surface thereof in a circumferential direction;
    a sleeve disposed above the lower thrust member and rotatably attached to the shaft; and
    a rotor hub coupled to the sleeve and rotating together therewith,
    the lower thrust member including a fitting protrusion protruded upwardly from an inner portion thereof in an axial direction and press-fitted into a fixing groove provided in a lower end portion of the shaft upwardly in the axial direction.

2. The spindle motor of claim 1, wherein an outer peripheral surface of the fitting protrusion is provided with a pressing protrusion.

3. The spindle motor of claim 2, wherein the fitting protrusion is fitted so that the pressing protrusion is disposed to correspond to a position of an inner peripheral surface of the shaft in which the expansion groove is provided in an outer peripheral surface thereof.

4. The spindle motor of claim 3, wherein the expansion groove is expanded in an outer diameter direction by the fitting of the pressing protrusion.

5. The spindle motor of claim 4, wherein the expansion groove is expanded so that at least a portion thereof is level with the outer peripheral surface of the shaft.

6. The spindle motor of claim 4, wherein the expansion groove is expanded so that at least a portion thereof is positioned inwardly of the outer peripheral surface of the shaft.

7. The spindle motor of claim 3, wherein the outer peripheral surface of the shaft or an inner peripheral surface of the sleeve has upper and lower radial dynamic pressure grooves, and
    the expansion groove is positioned between the upper and lower radial dynamic pressure grooves.

8. The spindle motor of claim 3, wherein the pressing protrusion is provided around the outer peripheral surface of the fitting protrusion in the circumferential direction in a circular manner.

9. The spindle motor of claim 3, wherein the pressing protrusion is provided around the outer peripheral surface of the fitting protrusion in the circumferential direction in a spiral manner.

10. The spindle motor of claim 1, wherein the fitting protrusion and the fixing groove have an adhesive applied therebetween.

11. The spindle motor of claim 1, wherein the shaft includes a through-hole allowing the fixing groove and the exterior to be in communication in the axial direction.

12. The spindle motor of claim 1, wherein the fitting protrusion of the lower thrust member includes a communications hole vertically penetrating therethrough in the axial direction.

13. The spindle motor of claim 1, wherein the lower thrust member forms a liquid-vapor interface between the lower thrust member and the sleeve.

14. The spindle motor of claim 1, further comprising an upper thrust member fixedly attached to an upper portion of the shaft and forming a liquid-vapor interface between the upper thrust member and the sleeve.

15. The spindle motor of claim 1, wherein the sleeve and rotor hub are formed integrally with each other.

16. The spindle motor of claim 1, wherein the base member and the lower thrust member are formed integrally with each other.

17. A hard disk drive comprising:
the spindle motor of claim 1 rotating a disk by power applied through a substrate;
a magnetic read/write head writing data to the disk and reproducing data from the disk; and
a magnetic read/write head transfer part transferring the magnetic read/write head to a predetermined position above the disk.

18. A hard disk drive comprising:
the spindle motor of claim 2 rotating a disk by power applied through a substrate;
a magnetic read/write head writing data to the disk and reproducing data from the disk; and
a magnetic read/write head transfer part transferring the magnetic read/write head to a predetermined position above the disk.

19. A hard disk drive comprising:
the spindle motor of claim 3 rotating a disk by power applied through a substrate;
a magnetic read/write head writing data to the disk and reproducing data from the disk; and
a magnetic read/write head transfer part transferring the magnetic read/write head to a predetermined position above the disk.

20. A hard disk drive comprising:
the spindle motor of claim 4 rotating a disk by power applied through a substrate;
a magnetic read/write head writing data to the disk and reproducing data from the disk; and
a magnetic read/write head transfer part transferring the magnetic read/write head to a predetermined position above the disk.

\* \* \* \* \*